(12) United States Patent
Yamanaka et al.

(10) Patent No.: US 7,733,046 B2
(45) Date of Patent: Jun. 8, 2010

(54) MOTOR CONTROLLER AND CONTROL METHOD THEREOF

(75) Inventors: Eri Yamanaka, Kitakyushu (JP); Nobuhiro Umeda, Kitakyushu (JP); Ken-ichi Murata, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 449 days.

(21) Appl. No.: 11/813,601

(22) PCT Filed: Jan. 6, 2006

(86) PCT No.: PCT/JP2006/300072

§ 371 (c)(1),
(2), (4) Date: Jul. 10, 2007

(87) PCT Pub. No.: WO2006/075554

PCT Pub. Date: Jul. 20, 2006

(65) Prior Publication Data

US 2008/0309272 A1    Dec. 18, 2008

(30) Foreign Application Priority Data

Jan. 11, 2005    (JP) .............................. 2005-004278

(51) Int. Cl.
*H02P 7/00*    (2006.01)

(52) U.S. Cl. ........................ 318/432; 318/561; 318/437; 318/434

(58) Field of Classification Search ................. 318/432, 318/561, 437, 434, 433, 608, 632, 565, 648, 318/560
See application file for complete search history.

(56) References Cited

U.S. PATENT DOCUMENTS

2007/0210731 A1 *   9/2007   Yoshiura et al. .............. 318/163

FOREIGN PATENT DOCUMENTS

| JP | 2000-172341 A | 6/2000 |
| JP | 2001-218488 A | 8/2001 |
| WO | 1996/037039 A1 | 11/1996 |

* cited by examiner

*Primary Examiner*—Karen Masih
(74) *Attorney, Agent, or Firm*—Sughrue Mion, PLLC

(57) ABSTRACT

A motor controller including a position control section that generates a speed command based on a position command and a motor position, a speed control section that generates a torque command based on the speed command and a motor speed, and a motor driving section that generates a motor current based on the torque command. The motor controller has a speed feed forward command generating section that generates a speed feed forward command by differentiating the position command. A model control section generates a model torque command based on the speed feed forward command and a model speed. An inertia identifying section identifies inertia based on the ratio of an integrated value of a motor torque command obtained by time-integrating the motor torque command in a prescribed section to an integrated value of the model torque command obtained by time-integrating the model torque command in a prescribed section, from a prescribed position command.

4 Claims, 9 Drawing Sheets

US 7,733,046 B2

MOTOR CONTROLLER AND CONTROL METHOD THEREOF

TECHNICAL FIELD

The present invention particularly relates to a motor controller for identifying inertia in a robot or a machine tool.

BACKGROUND ART

FIG. 2 shows a control structure of a related motor controller. Reference numeral 21 designates a motor control section, 22 designates a model control section, 23 designates a speed control proportional gain, 24 designates a differentiator, 25 designates an integrator, 26 designates a speed control proportional gain of the model control section, 27 designates an integrator showing inertia of the model control section and 28 designates an integrator. Further, Vref designates a speed command, Vfb designates a motor speed, Tref designates a torque command, STref designates a time integrated value of the torque command, Vfb' designates a model speed and STref' designates a time integrated value of the model torque command.

The related motor controller includes the motor control section for controlling the motor speed and the model control section for simulating a speed control by a model to identify the inertia by the ratio of a value STref obtained by integrating the torque command of a speed control section by a time to a value STref' obtained by time-integrating the torque command of the model control section (see Patent Document 1). Further, a related motor controller also includes a motor control section for controlling a motor speed and a model control section for simulating a speed control by a model to identify inertia J by the ratio of a time integrated value of the torque command STref obtained by time-integrating a filtered value of the torque command Tref of the motor control section in prescribed sections [a,b] shown in FIG. 4 to a time integrated value of the model torque command STref' obtained by time-integrating the torque command Tref' of the model speed control section in the same sections, and adjust the speed gain Kv of the motor control section based on the identified inertia J (see Patent Document 2).

Patent Document 1: International Patent Application Laid-Open No. 1996/37039 pamphlet (see page 6, FIG. 1)
Patent Document 2: JP-A-2001-218488 (see page 2, FIG. 1)

DISCLOSURE OF THE INVENTION

Problems that the Invention is to Solve

Since a related inertia identification device does not include a position control section and includes a speed control section, a position after the identification deviates from a position at the time of starting the identification under an environment that a load comes under the influence of an external force such as gravity, for example, vertical axis. When inertia exceeds the allowable value, a large accelerating torque is generated. Thus, there are problems that the related inertia identification device is hardly realized.

The present invention is devised by considering the above-described problem. It is an object of the present invention to provide a motor controller and a control method thereof in which even when an external force is present, a position after identification does not deviate from a position at the time of starting the identification and even when inertia is so large as to exceed the allowable value, a large torque is not generated, so that realization of inertia identification can be easily carried out.

Means for Solving the Problems

The present invention as set forth in claim 1 is directed to a motor controller including a position control section that generates a speed command based on a position command and a motor position, a speed control section that generates a torque command based on the speed command and a motor speed, and a motor driving section that generates a motor current based on the torque command, and the motor controller comprises: a speed feed forward command generating section that generates a speed feed forward command by differentiating the position command; a model control section that generates a model torque command based on the speed feed forward command and a model speed; and an inertia identifying section that identifies inertia based on the ratio of an integrated value of a motor torque command obtained by time-integrating the motor torque command in a prescribed section to an integrated value of the model torque command obtained by time-integrating the model torque command in a prescribed section, from a prescribed position command The present invention as set forth in claim 2 is directed to the motor controller according to claim 1 and the motor controller further comprises: a proportional gain setting section that changes a proportional gain of the position control section to be inversely proportional to the maximum allowable value of the inertia.

The present invention as set forth in claim 3 is directed to the motor controller according to claim 1 and the motor controller further comprises: a proportional gain setting section that sets a position control proportional gain so that relationship between the maximum allowable value of the inertia and the position control proportional gain is in inverse proportion to each other.

The present invention as set forth in claim 4 is directed to a motor control method of a motor controller including a position control section that generates a speed command based on a position command and a motor position, a speed control section that generates a torque command based on the speed command and a motor speed, and a motor driving section that generates a motor current based on the torque command and the motor control method comprises steps of: generating a prescribed position command; generating a speed feed forward command based on the position command; generating a model torque command based on the speed feed forward command and a model speed; generating an integrated value of the motor torque command obtained by time-integrating the motor torque command in a prescribed section; generating an integrated value of the model torque command obtained by time-integrating the model torque command in a prescribed section and; identifying inertia based on the ratio of the integrated value of the motor torque command to the integrated value of the model torque command.

ADVANTAGE OF THE INVENTION

The present invention according to claim 1 can identify inertia without displacement involved upon an identifying operation, even when an external force is present.

The present invention according to claim 2 can carry out an identifying operation without generating a large accelerating speed, even when inertia is so large as to exceed the allowable value.

The present invention according to claim 3 can be easily realized.

The present invention according to claim 4 can provide a method that can identify the inertia without generating the displacement upon an identifying operation even when an external force is present.

Figure 1:
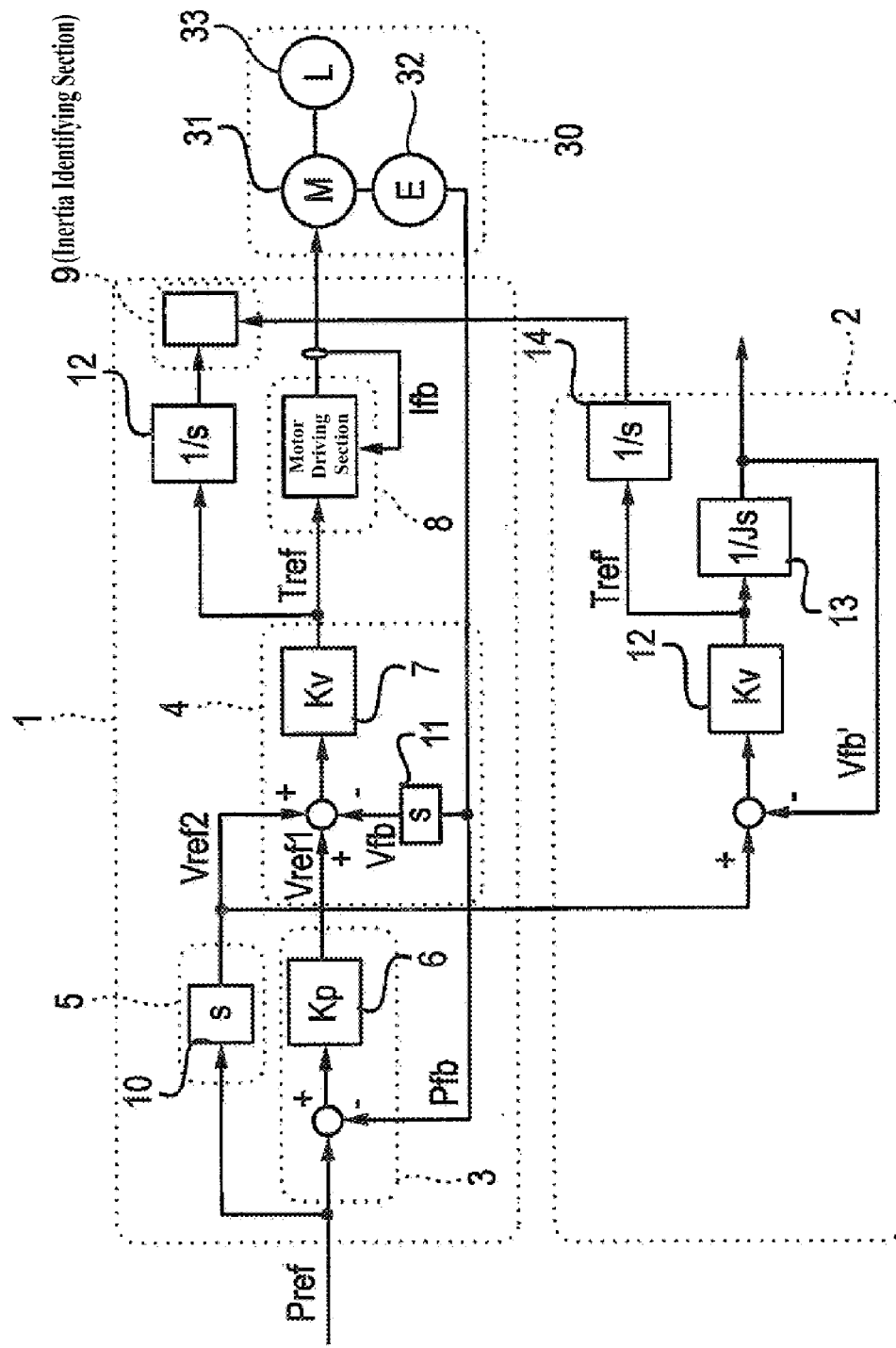
FIG. 1 is a control block diagram showing a first embodiment of the present invention.

DESCRIPTION OF REFERENCE NUMERALS AND SIGNS 1 motor control section
2 model control section
3 position control section
4 speed control section
5 speed feed forward command generating section
6 position control proportional gain
7 speed control proportional gain
8 motor driving section
9 inertia identifying section
10,11 differentiator
12 speed control proportional gain of model control section
13 integrator showing inertia of motor
14 integrator
30 controlled object section
31 motor
232 position sensor
33 load
Pref position command
Pfb motor position generated by position sensor
Vref1 speed command 1 generated by position control proportional gain
Vref2 speed command 2 generated by speed feed forward command generating section
Vfb motor speed obtained by differentiating motor position
Tref torque command
Ifb motor current
Stref time integrated value of torque command
Vfb' model speed
Tref' model torque command
Stref' time integrated value of model torque command

BEST MODE FOR CARRYING OUT THE INVENTION

Now, an embodiment of the present invention will be described below by referring to the drawings.

First Embodiment

FIG. 1 shows a control configuration of inertia identification device according to the present invention. In FIG. 1, 1 designates a motor control section, 2 designates a model control section, 3 designates a position control section, 4 designates a speed control section, 5 designates a speed feed forward command generating section, 6 designates a position control proportional gain, 7 designates a speed control proportional gain, 8 designates a motor driving section, 9 designates an inertia identifying section, 10 and 11 designate differentiators, 12 designates a speed control proportional gain of the model control section, 13 designates an integrator showing inertia of a motor and 14 designates an integrator. Next, 30 designates an controlled object section, 31 designates the motor, 32 designates a position sensor and 33 designates a load. Further, Pref designates a position command, Pfb designates a motor position generated by the position sensor, Vref1 designates a speed command 1 generated by the position control proportional gain, Vref2 designates a speed command 2 generated by the speed feed forward command generating section, Vfb designates a motor speed obtained by differentiating the motor position, Tref designates a torque command, Ifb designates a motor current, STref designates a time integrated value of torque command, Vfb' designates a model speed, Tref' designates a model torque command and Stref' designates a time integrated value of the model torque command.

Figure 3:
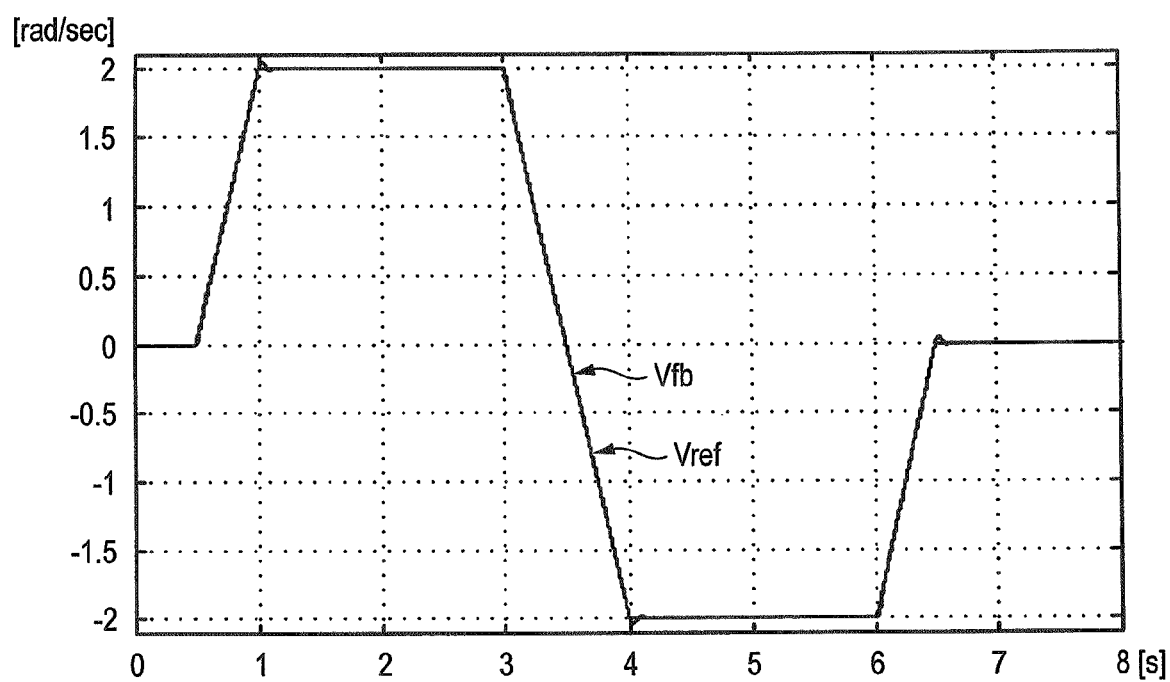
FIG. 3 shows a simulation result of a speed response when the present invention is used.
Figure 4:
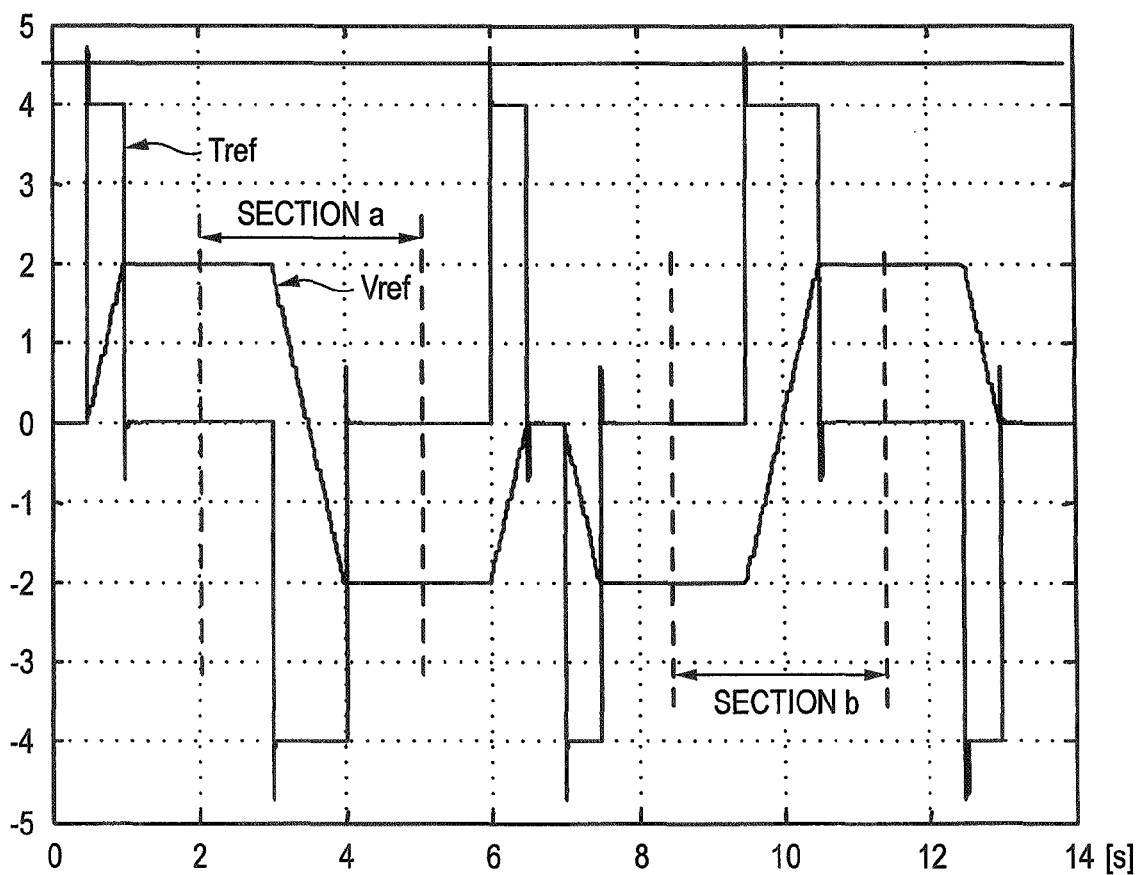
FIG. 4 is a diagram showing integrating sections of a torque used for a calculation to identify inertia.
Figure 5:
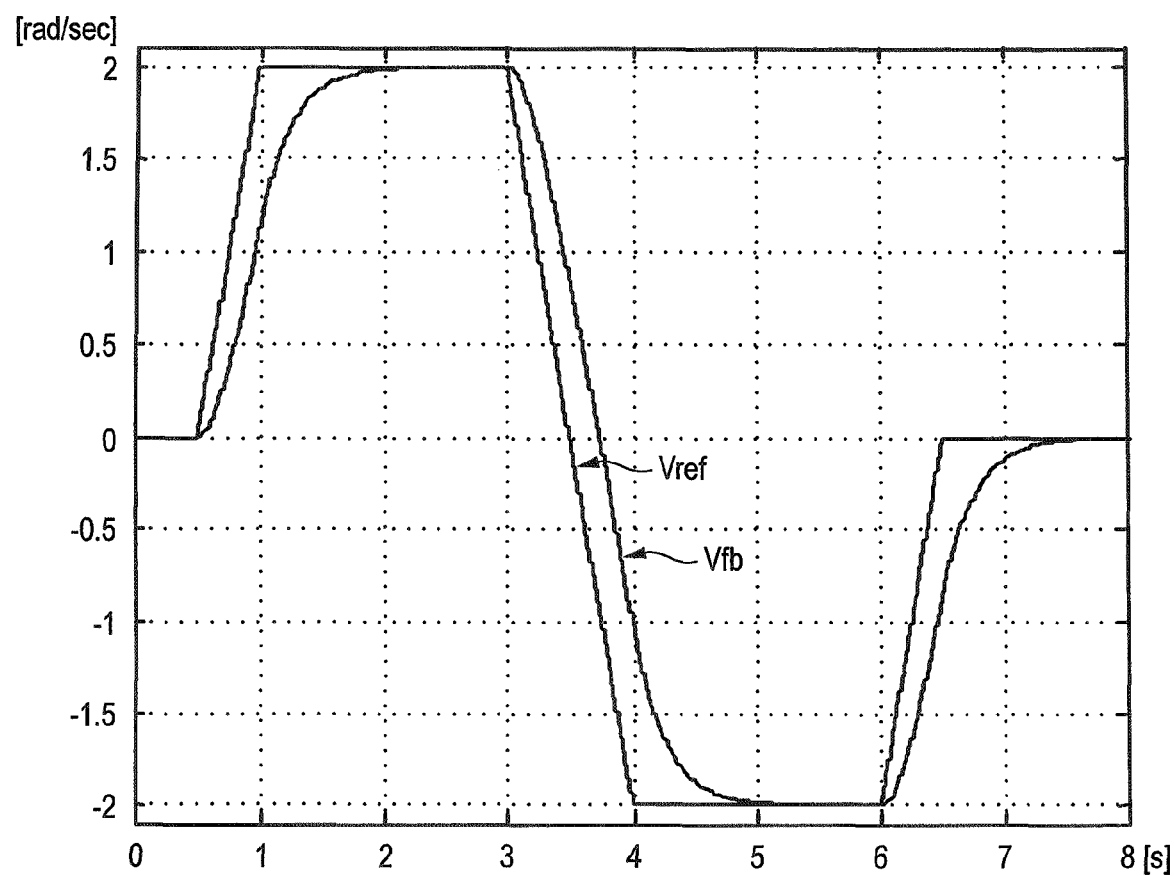
FIG. 5 shows a simulation result of a speed response when there is no speed feed forward command.
Figure 6:
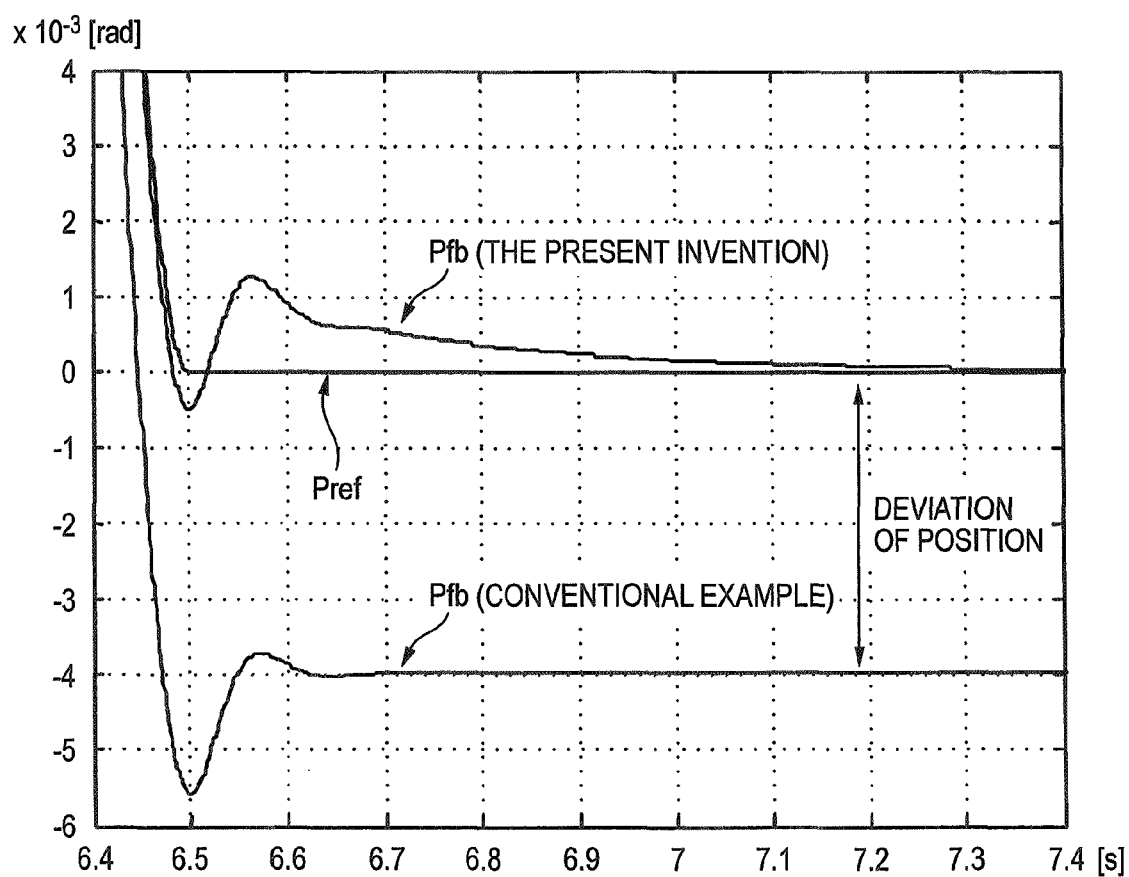
FIG. 6 shows simulation results when the positional response of the present invention is compared with that of a related method.

The features of the present invention are described below. The motor control section is comprised by the position control section and the speed control section. Further, a speed feed forward command obtained by differentiating the position command is supplied to the speed control section. Thus, the responsiveness of speed in position control can be improved. In a speed response shown in FIG. 3 obtained using the present invention, the speed command substantially corresponds to the speed response. Thus, the torque command corresponding to the speed command is supplied to the motor, so that the same speed response as the usual case having no position control section can be obtained. Accordingly, similarly to the usual method, the inertia J can be identified based on the ratio of the time integrated value of torque command STref obtained by time-integrating a filtered value of the torque command Tref of the motor speed control section in prescribed sections [a, b] shown in FIG. 4 to the time integrated value of the model torque command STref' obtained by time-integrating the torque command Tref' of a model speed control section in the same sections. When the position control is used without the speed feed forward command as shown in FIG. 5, the speed response is delayed relative to the speed command due to the influence of the position control proportional gain Kp. Therefore, when a calculating method for identifying the inertia is directly applied, accuracy is deteriorated.

Figure 2:
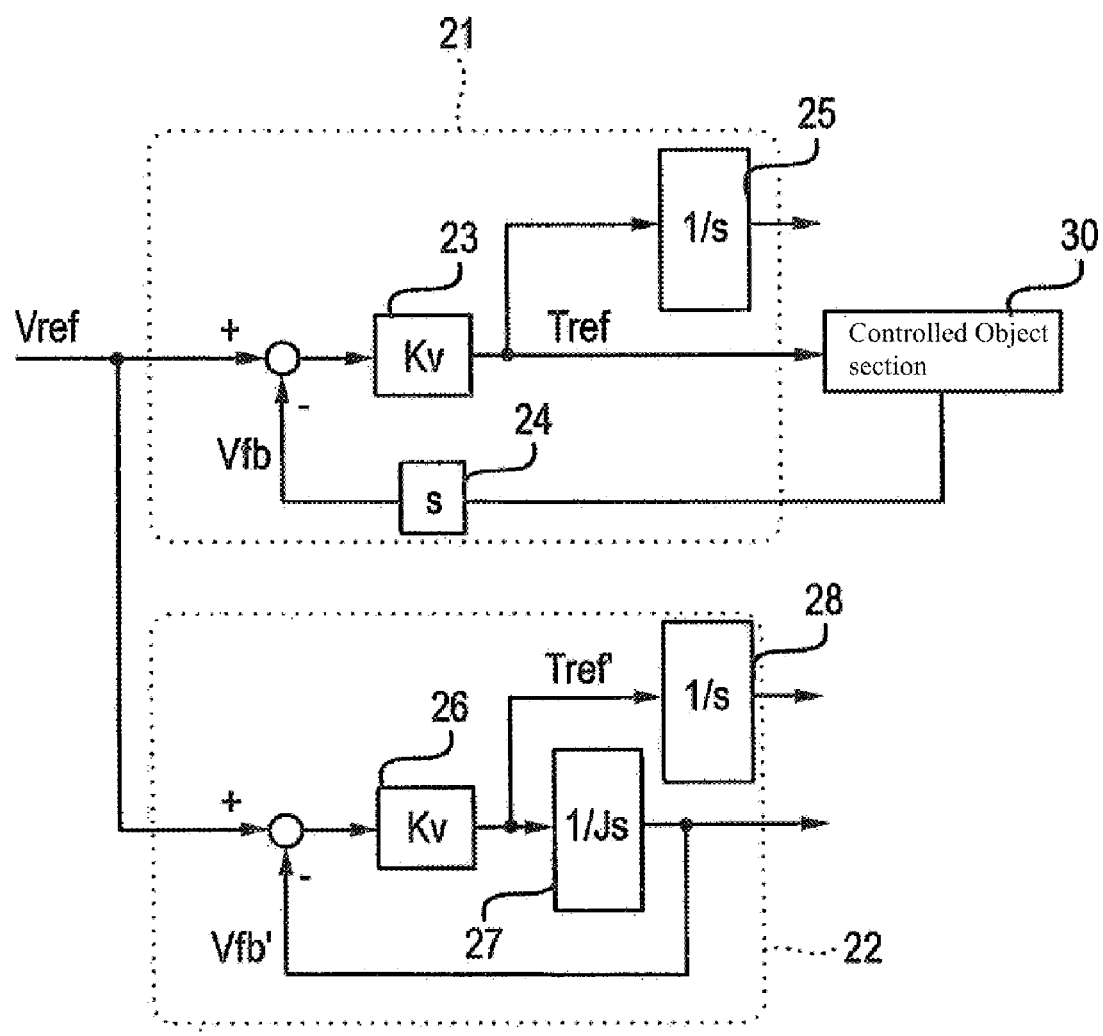
FIG. 2 is a control block diagram showing a related inertia identification device.

Next, an operation will be described. For instance, when a slider of a vertical axis is operated by the motor and the inertia identification device of the present invention is used, due to the configuration of the position control, a position after an identifying operation can be returned to a position at the time of starting the identifying operation. When the inertia is identified by the related method shown in FIG. 2 by using the same machine, due to the configuration of the speed control, a position obtained after the identifying operation is completed remains shifting downward by the influence of gravity. According to a simulation result that a position response of the present invention is compared with that of the related method, it is understood that when the present invention is used, the position response returns to 0 and when the related method is used, the position response does not return to 0.

Here, as the structure of the machine, the slider of the vertical shaft is exemplified as an example, however, the inertia identification device of the present invention can be applied to other structure of machines coming under the influence of external force.

Second Embodiment

In such a machine as shown in the first embodiment, when identifying inertia is extremely large, there is a possibility that a motor generates a large torque to make an operation unstable. When inertia identification device as set forth in claim 2 is employed, a position gain is changed to meet the tolerance of the identifying inertia, the operation can be stabilized without generating the large torque. Further, similarly, when inertia identification device as set forth in claim 3 is similarly used, since a simple equation is set in accordance with the tolerance of identifying inertia to automatically determine a position gain, an operation is easy.

A result obtained by carrying out the present invention is described below. An equation for determining a position proportional gain inversely proportionally to the increase of the inertia is determined as described below.

$$Kp = Kv/J \quad (1)$$

Figure 7:
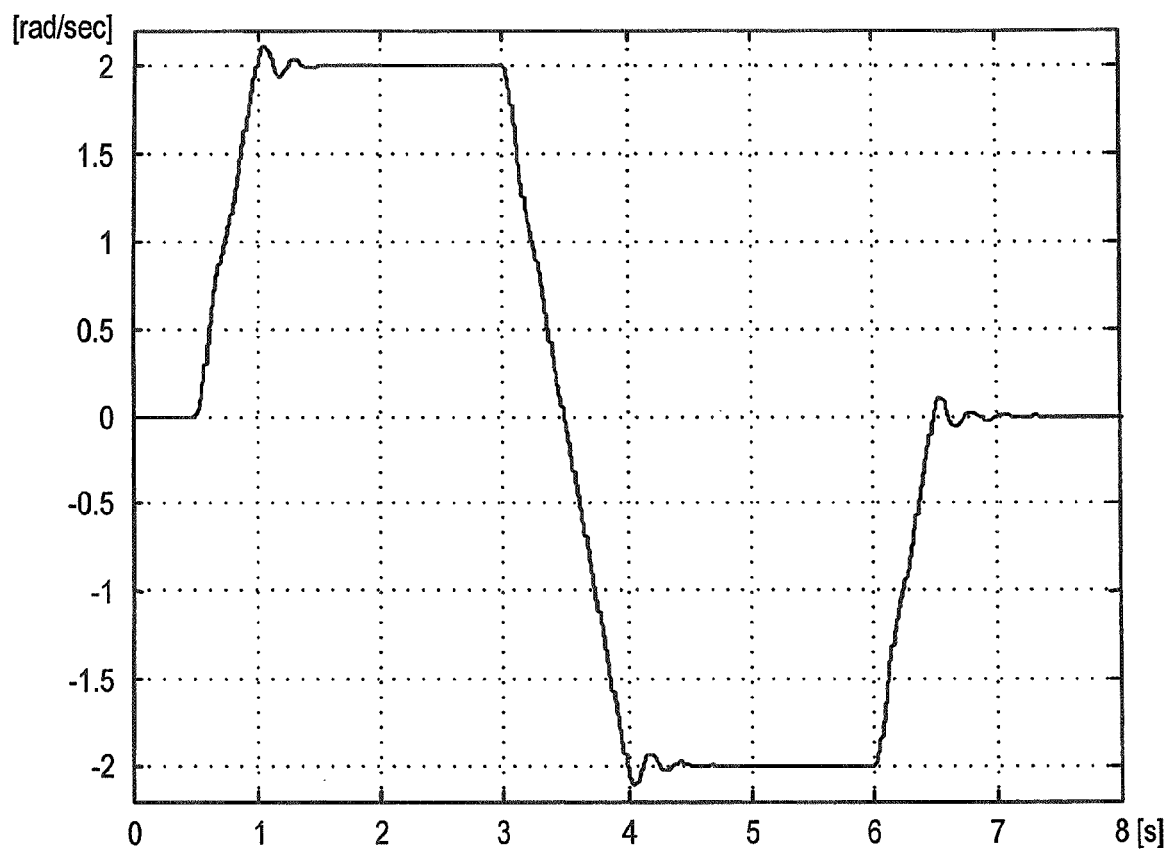
FIG. 7 shows a simulation result of the present invention when an equation (1) is applied.
Figure 8:
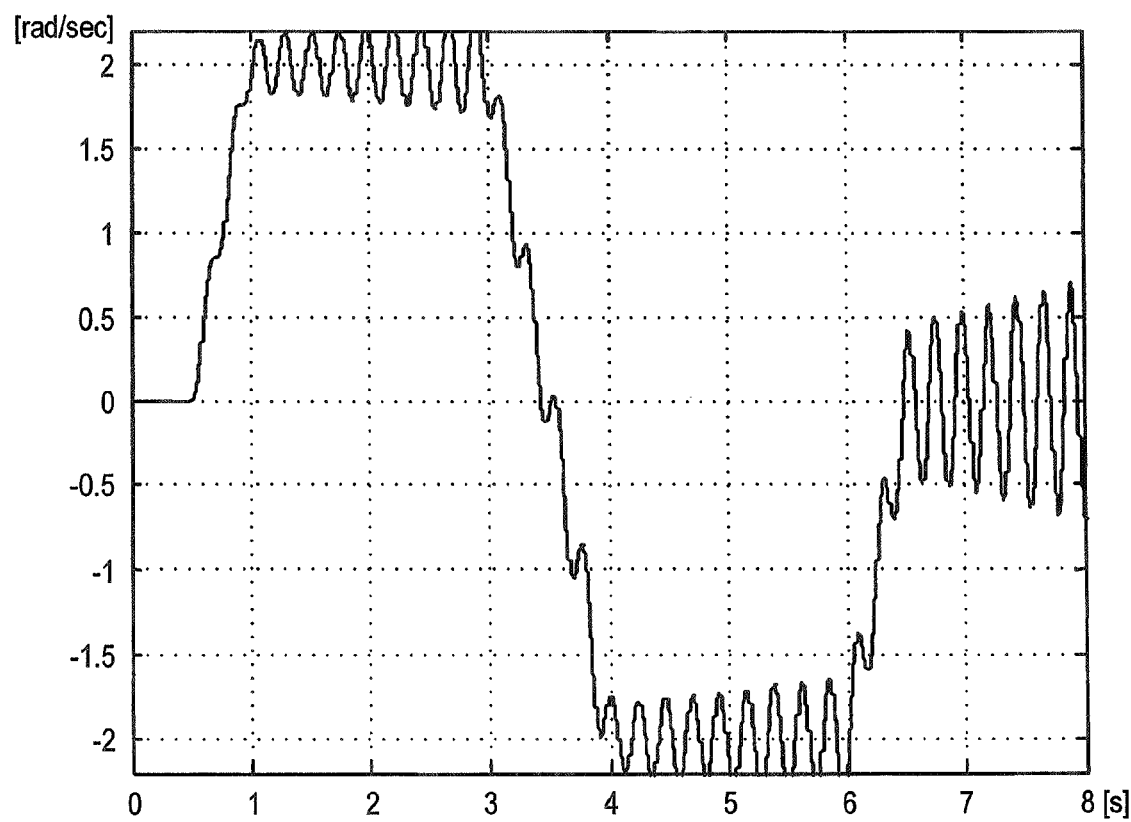
FIG. 8 shows a simulation result of the present invention when an equation (1) is not applied.

Kp designates the position control proportional gain, Kv designates the speed control proportional gain and J designates the inertia. When the maximum allowable value of the inertia is $J_{max}$, Kp is set to $Kv/J_{max}$. Now, it is assumed that the tolerance of the inertia is 20 times as large as the inertia of the motor and a speed gain is 40 Hz. When the object inertia is one time as large as the inertia of the motor, if a position loop gains is equal to a speed loop gain, a sufficiently stable response is obtained. However, when the object inertia within the tolerance is 20 times as large as the inertia of the motor, if the position loop gain is not lowered by using the equation (1), the response is unstable. FIG. 7 shows a result obtained when the equation (1) is applied and shows a speed response when the inertia is set to 20 times and the position gain is set to 2. During accelerating and decelerating, a vibration is generated, however, when the speed is constant, the vibration is damped. FIG. 8 shows a result obtained when the equation (1) is not applied and shows a speed response when the inertia is set to 20 times and the position gain remains to be set to 40. During accelerating and decelerating, the vibration is generated and even when the speed is constant, the vibration is not damped and generated.

Figure 9:
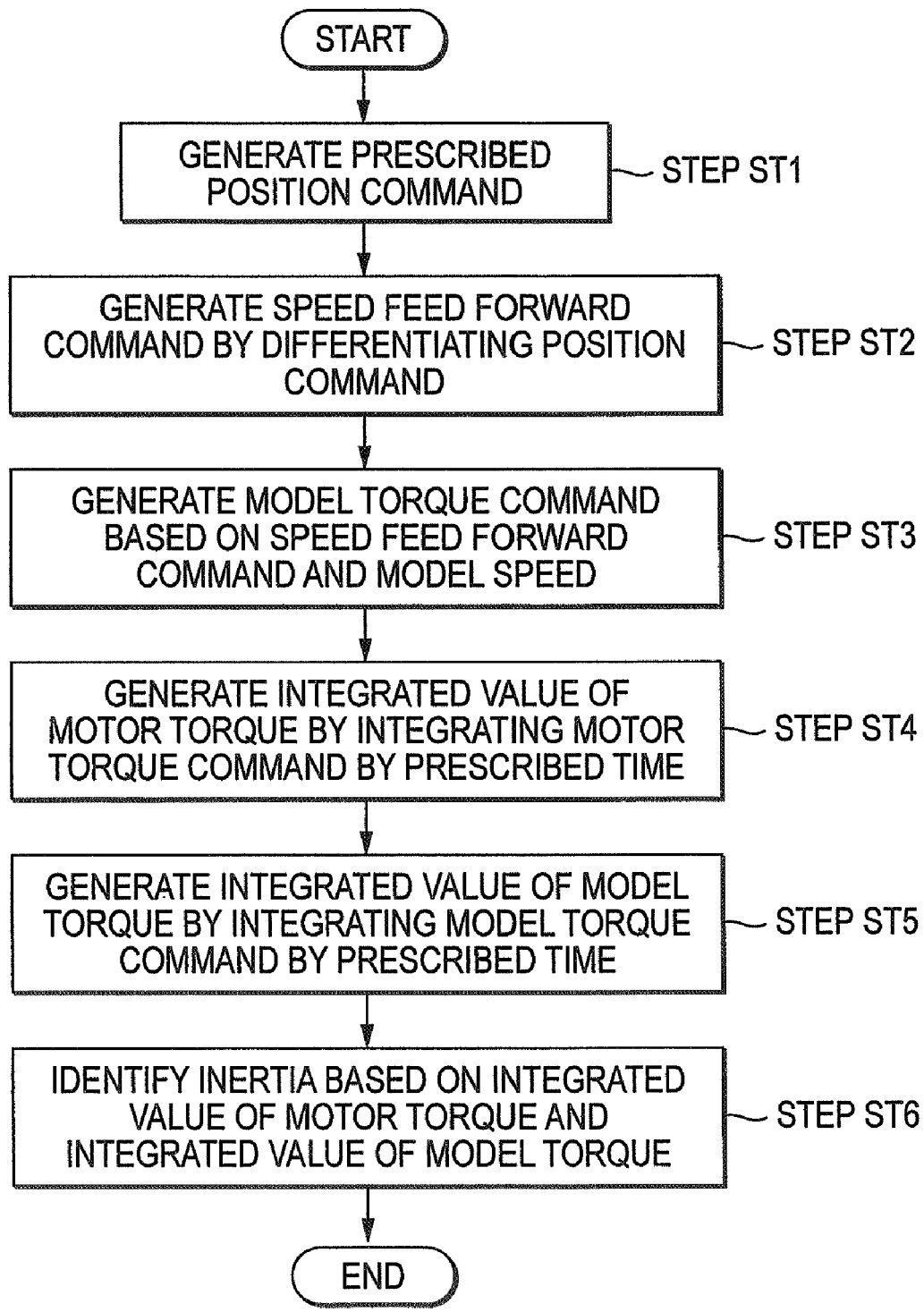
FIG. 9 is a flowchart showing a method of the present invention.

FIG. 9 is a flowchart showing a method of the present invention. In FIG. 9, a prescribed position command is generated in step ST1. In step ST2, the position command is differentiated to generate a speed feed forward command. In step ST3, a model torque command is generated from the speed feed forward command and a model speed. In step ST4, the torque command of the motor is integrated by a prescribed time to generate an integrated value of the motor torque command. In step ST5, the torque command of a model is integrated by a prescribed time to generate an integrated value of the model torque command. In step ST6, the inertia is obtained from the motor torque command value and the integrated value of the model torque command.

INDUSTRIAL APPLICABILITY

The present invention can be applied not only to the controller of the robot or the machine tool, but also to the case where a weight or the inertia is measured in a home appliance or a motor vehicle.

The invention claimed is:

1. A motor controller including a position control section that generates a speed command based on a position command and a motor position, a speed control section that generates a torque command based on the speed command and a motor speed, and a motor driving section that generates a motor current based on the torque command, the motor controller comprising:

a speed feed forward command generating section that generates a speed feed forward command by differentiating the position command;

a model control section that generates a model torque command based on the speed feed forward command and a model speed; and an inertia identifying section that identifies inertia based on the ratio of an integrated value of a motor torque command obtained by time-integrating the motor torque command in a prescribed section to an integrated value of the model torque command obtained by time-integrating the model torque command in a prescribed section, from a prescribed position command.

2. The motor controller according to claim 1, further comprising:

a proportional gain setting section that changes a proportional gain of the position control section to be inversely proportional to the maximum allowable value of the inertia.

3. The motor controller according to claim 1, further comprising:

a proportional gain setting section that sets a position control proportional gain so that the relationship between the maximum allowable value of the inertia and the position control proportional gain is in inverse proportion to each other.

4. A motor control method of a motor controller including a position control section that generates a speed command based on a position command and a motor position, a speed control section that generates a torque command based on the speed command and a motor speed, and a motor driving section that generates a motor current based on the torque command, the motor control method comprising steps of:

generating a prescribed position command;

generating a speed feed forward command based on the position command;

generating a model torque command based on the speed feed forward command and a model speed;

generating an integrated value of the motor torque command obtained by time-integrating the motor torque command in a prescribed section;

generating an integrated value of the model torque command obtained by time-integrating the model torque command in a prescribed section and;

identifying inertia based on the ratio of the integrated value of the motor torque command to the integrated value of the model torque command.

* * * * *